United States Patent [19]

Cellier et al.

[11] Patent Number: 4,687,605
[45] Date of Patent: Aug. 18, 1987

[54] MANUFACTURING AUTOMATION SYSTEM FOR NUCLEAR FUEL ROD PRODUCTION

[75] Inventors: Francis Cellier, Export, Pa.; Robert T. Graulty, Columbia, S.C.; Wendell L. Johnson, Dentsville, S.C.; David M. Batson, Lexington, S.C.; John C. Limpert, Export, Pa.; Christopher K. C. Wu, Columbia, S.C.; George D. Bucher, Allison Park, Pa.; Clarence D. John, Jr., Penn Hills, Pa.; John E. Steinkirchner, Penn Hills, Pa.; Paula J. Larouere, North Versailles, Pa.; Hemant H. Shah, Monroeville, Pa.; Robert A. Williams, Columbia, S.C.

[73] Assignee: Westinghouse Electric Corp., Pittsburgh, Pa.

[21] Appl. No.: 702,520

[22] Filed: Feb. 19, 1985

[51] Int. Cl.$^4$ .................. G21C 21/00; G21C 3/62; C01G 43/02; C01G 43/06
[52] U.S. Cl. .................... 264/0.5; 252/636; 252/637; 252/643; 376/426; 423/19; 423/258; 423/261
[58] Field of Search ............ 376/421, 426, 429; 252/632, 636, 641, 643; 264/0.5; 422/159; 148/132; 75/84.1 R; 250/496.1; 423/19, 253, 258, 260–261

[56] References Cited

U.S. PATENT DOCUMENTS

| | | | |
|---|---|---|---|
| 3,978,194 | 8/1976 | Knudsen et al. | 252/636 |
| 4,020,146 | 4/1977 | Knudsen | 252/636 |
| 4,031,029 | 6/1977 | Colter et al. | 252/636 |
| 4,042,670 | 8/1977 | Kruger | 252/636 |
| 4,053,559 | 10/1977 | Hart et al. | 252/636 |
| 4,061,700 | 12/1977 | Gallivan | 264/0.5 |
| 4,090,976 | 5/1978 | DeHollander et al. | 252/636 |
| 4,138,360 | 2/1979 | Gallivan | 264/0.5 |
| 4,383,953 | 5/1983 | Larson et al. | 264/0.5 |
| 4,389,341 | 6/1983 | Gaines, Jr. et al. | 264/0.5 |
| 4,427,579 | 1/1984 | Gaines, Jr. et al. | 264/0.5 |
| 4,522,769 | 6/1985 | Connolly, Jr. et al. | 264/0.5 |

Primary Examiner—Stephen J. Lechert, Jr.
Assistant Examiner—Howard J. Locker

[57] ABSTRACT

An automated fuel rod production system includes a radioactive powder fabrication and processing stage, a pellet fabrication stage, a pellet processing stage, a tube preparation stage and a fuel rod fabrication and inspection stage, all of which provide a continuous (paced) mode of operation from the conversion of a radioactive gas to powder, through the fabrication of the powder into pellets, to completion of the assembly of the fuel rods. Extra capacity is designed into the system at critical points in the powder processing and pellet fabrication and processing stages to facilitate the continuous, paced mode of operation.

6 Claims, 8 Drawing Figures

MANUFACTURING AUTOMATION SYSTEM FOR NUCLEAR FUEL ROD PRODUCTION

BACKGROUND OF THE INVENTION

1. Field of the Invention

The present invention relates generally to production of nuclear fuel rods for use in nuclear reactors and, more particularly, is concerned with a unique automated system for the production of nuclear fuel rods starting from the conversion of a radioactive gas to powder, through the fabrication of the powder into pellets, to completion of the assembly of the fuel rods.

2. Description of the Prior Art

Conventional nuclear reactors include fuel elements, generally called fuel rods. The fuel rods contain fissile material and are grouped together in arrays which are organized to produce a neutron flux in the reactor core sufficient to support a high rate of nuclear fission and thus the release of a large amount of energy in the form of heat. A coolant such as water is pumped upwardly through the arrays of fuel rods in the reactor core in order to extract some of the heat for the production of useful work.

Typically, a fuel rod is composed of an elongated hollow metallic tube which contains the nuclear fuel material in the form of a stack of cylindrical fuel pellets. The tube is closed at its opposite ends by upper and lower end plugs which are rigidly attached to the tube ends by girth welds so as to hermetically seal the tube. During operation of the reactor core, the fuel rods are subjected to high temperatures and pressures within the core which cause elongation of the tube and pellets due to thermal growth and vibration of the fuel rods due to coolant flow. Thus, the pellets are fabricated to very exacting dimensions so as to produce a controlled diametrical clearance between the pellets and the inside of the tube to accommodate pellet growth due to thermal expansion and fuel swelling. Additionally, in view that pellets are brittle and will easily chip upon impact, a coil spring is ordinarily disposed within the tube between the upper end plug and the top of the pellet stack to restrain damaging impacts between the pellets due to rod vibration.

Fuel rod manufacturing conventionally involves beginning with the radioactive material in powder form and then blending it to the desired chemical composition. The properly blended powder is then made into pellets by first forming it into slugs, then granulating the slug and mixing a lubricant with the granulates, and lastly pressing the lubricated granulates into green pellets. The green pellets are fed into a sintering furnace where high temperatures sinter the pellets in a hydrogen atmosphere to achieve the required density and microstructure. After exiting the furnace, the sintered pellets are fed to a wet grinding process for grinding them to precise dimensions. Before insertion into the fuel rod tube, the finished pellets are visually inspected. After the pellets are placed in the tubes, the completed fuel rods are subjected to several different inspections.

Due to the fact that fissile material is involved, fuel rod manufacturing up to the present time has been carried out in conformity with the regulatory requirement of geometric control of the radioactive material being converted into fuel pellets. Geometric control relates to a safeguard which eliminates the possibility of a chain reaction occurring by limiting the quantity of radioactive material assembled together to an amount significantly less than the critical mass needed for fission. This safeguard was implemented by the performance of a high degree of manual handling of radioactive materials and fuel rod components during the various manufacturing stages of what has been termed a batch mode of operation.

For instance, a batch of radioactive material of a given enrichment had to be processed completely through a given stage of the manufacturing process and the equipment emptied of all residual material of that enrichment before material from a different batch having a different enrichment could be processed. Thus, with respect to each batch, typically, in the initial stage each worker carried an individual container filled with a small quantity of radioactive material from the batch in powder form to the blender. Once the material was properly blended, the worker then manually transferred the blended powder to the pelleting stage where this quantity of material was fabricated into pellets. The green pellets were then loaded manually by the worker into a sintering boat which was taken to the infeed end of a sintering furnace and then unloaded manually. After being conveyed through the furnace, the sintered pellets were manually picked up and fed to the wet grinding station. Then, the ground pellets were manually placed on inspection trays. After visual inspection, the pellets were manually inserted into tubes which in the meantime had been manually handled through various stages involving the inspection and cleaning of the tubes and attachment of end plugs thereto.

Another regulatory requirement which was implemented most effectively by the performance of a high degree of manual handling of radioactive materials and fuel rod components during the various stages of the manufacturing operation was the need for traceability of the radioactive material from its initial powder form to its final form as pellets in a completed fuel rod. Without much difficulty, a worker who began with a certain quantity of radioactive material from a known batch and transported it through successive stages of the manufacturing operation could identify which completed fuel rods contained material from the particular batch.

While the high degree of manual involvement in fuel rod manufacturing up to the present time has assisted the nuclear industry in meeting the regulatory requirements of geometric control and traceability and thus has served the industry well over the past several decades, such involvement has tended to constrain improvement in manufacturing productivity and product quality. Consequently, a need has evolved for a different approach to fuel rod manufacture which promises increased manufacturing efficiency and productivity and improved product quality and reliability while at the same time meets all regulatory requirements.

SUMMARY OF THE INVENTION

The present invention provides a unique automated system for the production of nuclear fuel rods which is designed to satisfy the aforementioned needs. Starting from the conversion of a radioactive gas to powder, through the fabrication of the powder into pellets, to completion of the assembly of the fuel rods, the present invention provides interrelated fuel rod production stages which fully integrate and transform what are otherwise conventional manufacturing process steps per se, some of which were used heretofore in conjunction with a batch mode operation, into a dedicated, continuous or paced, flow mode of operation. The automated system of the present invention is designed to have a production capacity of 400 MTU (metric tons uranium) of fuel rods per year which represents a significant departure from the existing batch system capable of producing approximately 200 MTU per year.

Major factors contributing to productivity and quality improvements in the automated system are as follows. First, the use of the Integrated Dry Route (IDR) method, instead of the Ammonium Di Urinate (ADU) method, for the conversion of $UF_6$ gas to $UO_2$ powder. This process, licensed from British Nuclear Fuels Limited, consistently produces a more fabricable powder of higher sinterability than is achieved using the ADU conversion process. Second, the utilization of bulk blending methods contributes to improved product consistency. These methods used in association with pneumatic conveying significantly reduce material handling requirements, personnel exposure and airborne contamination levels. Third, integration into the automated system of product inspection operations utilizing advanced technology and of automation of materials handling and process control reduces operator dependency and improves product quality. Fourth, line manning and operation of the total system ($UF_6$ through completed fuel rods) is on a team basis. This is expected to improve morale and group productivity, and reduce manpower requirements. Fifth, increased automation of the production line results in fewer personnel actually working on the line. Improved containment and processing methods, and use of advanced ventilation systems will minimize operator exposures and resultant lost time due to work restrictions. Finally, implementation of a fully integrated Management Information System (MIS) employing automated data imput provides a central information network for management visibility, and production planning and control. The MIS will ensure material accountability, quality control and product traceability so as to satisfy both customer and regulatory requirements.

Accordingly, the present invention sets forth an automated system of nuclear fuel rod production composed of a plurality of interrelated stages. First, a radioactive powder formulation and processing stage comprises the combination of: (a) a plurality of kiln units for receiving a radioactive material in the form of a gas and converting the radioactive material to the form of a powder; (b) a plurality of check hopper units being connected in flow communication with each of the kiln units for receiving the powder from the kiln units, for holding the powder for sampling and inspection and for dispensing the powder therefrom such that as at least one of the check hopper units is being filled from its respective one kiln unit, at least another of the check hopper units is dispensing its powder whereby powder can be continuously dispensed from at least one of the check hopper units; (c) a plurality of blending units connected in flow communication with the check hopper units for receiving the powder from the check hopper units and for blending the powder into a radioactive composition suitable for fabrication into a nuclear reactor fuel, the plurality of blending units being fewer in number than the check hopper units; and (d) valve means for causing the filling of one of the plurality of blending units at a time with powder from the check hopper units such that as one of the blending units is being filled, blended powder is being dispensed from another of the blending units whereby blended powder can be dispensed continuously from the blending units for subsequent fabrication into a form suitable for use as nuclear fuel. Also, the plurality of blending units includes yet another blending unit containing blended powder which can be analyzed as the one of the blending units is being filled with powder and as blended powder is being dispensed from the other of the blending units.

Second, the automated system of nuclear fuel rod production includes a radioactive pellet fabricating stage comprising a plurality of pellet fabricating units for receiving blended powder of a radioactive composition suitable to be used as nuclear fuel. The pellet fabricating units are operable to press the powder into slugs, then granulate the slugs, next mix the granulated powder with lubricant and finally form the mixture into a succession of green pellets of the radioactive composition. The fabricating units are capable of providing a continuous stream of the green pellets even when one of the fabricating units is temporarily out of commission.

Third, the automated system includes a pellet processing stage comprising the combination of: (a) a plurality of sintering furnace units, each being adapted to receive green pellets at an infeed end thereof, to sinter the pellets as they are moved through the furnace, and to discharge the pellets at the completion of sintering, the sintering furnaces being greater in number than the green pellets fabricating units so as to be capable of providing a continuous stream of sintered pellets even when one of the furnaces is temporarily out of commission; and (b) means for receiving the sintered pellets in a successive manner after discharged from the sintering furnaces for periodically sampling random ones of the sintered pellets. More particularly, the pellet processing stage further comprises: (c) a multiplicity of sintering boats; (d) means for conveying the sintering boats and for providing surge storage thereof; and (e) means for loading green pellets from the pellet fabrication units into the sintering boats on the conveying means. The conveying means is operably arranged with the plurality of sintering furnace units such that each of the loaded boats is directed to the infeed end of one of the furnaces, is moved through the one furnace for sintering the pellets loaded therein and is directed from a discharge end of the one furnace at the completion of sintering. Still further, the pellet processing stage includes: (f) a plurality of pellet grinding units for grinding the sintered pellets to precise predetermined dimensions; (g) means for unloading sintered pellets from the boat on the conveying means in single file into the pellet grinding units; (h) a plurality of inspection units for inspecting the ground pellets; (i) a pellet storage and retrieval unit for receiving the inspected pellets and storing the same; and (j) means for conveying the pellets in single file from the grinding units through the inspection unit to the storage and retrieval unit.

Finally, the automated system for fuel rod production includes tube preparation and fuel rod fabrication and inspection stages comprising:
 (a) means for preparing fuel rod tubes for receiving the stored pellets;
 (b) means for assembling the tubes and pellets into completed fuel rods; and
 (c) means for inspecting the completed fuel rods.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is a detailed block flow diagram of the process steps involved in the pellet processing stage of the automated fuel rod manufacturing system.

DETAILED DESCRIPTION OF THE INVENTION

Figure 1:
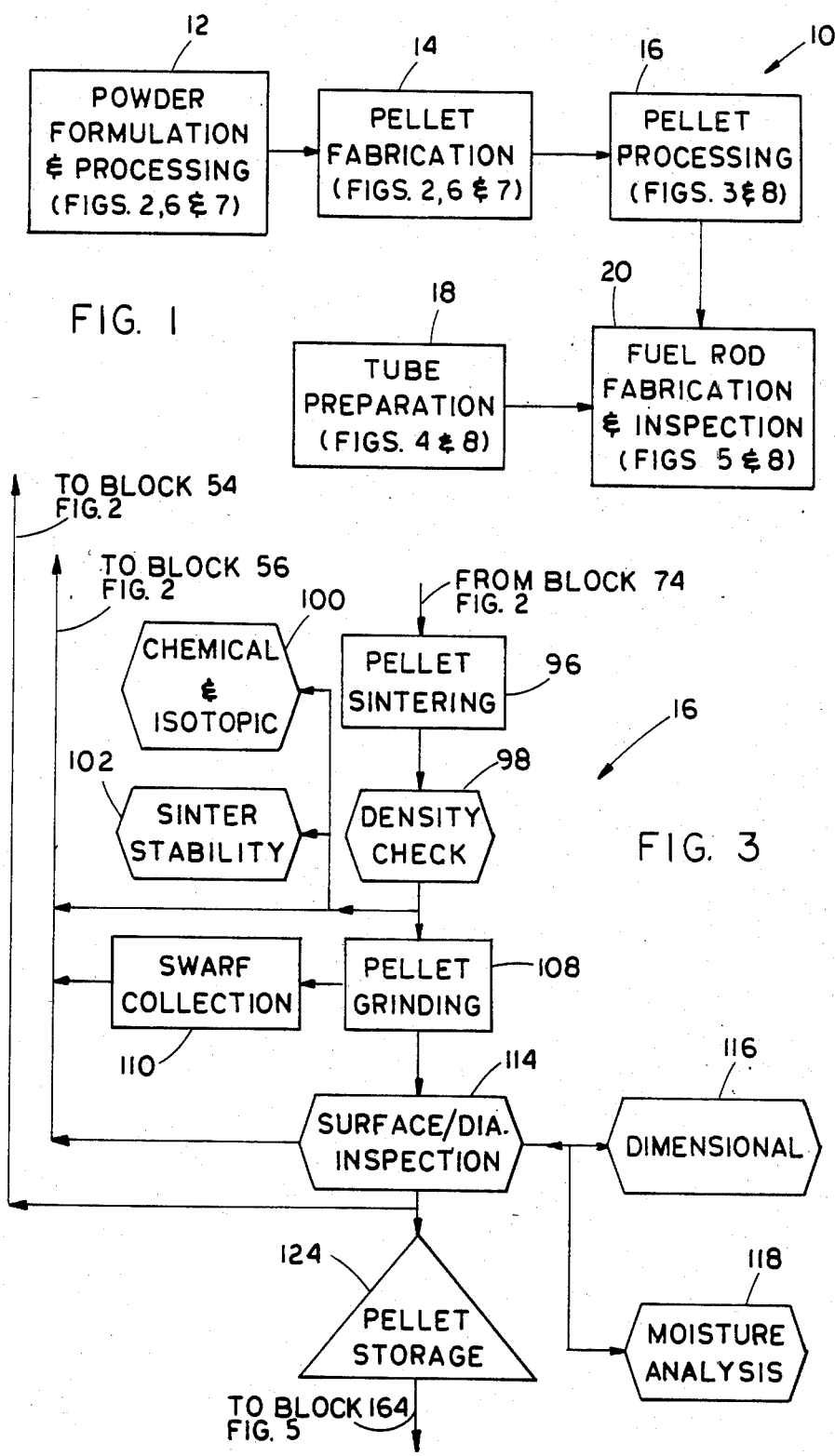
FIG. 1 is an overall block diagram of the main stages of the automated fuel rod manufacturing system of the present invention, and provides a guide to the figures in which the process steps and equipment involved in each of the stages of the system are illustrated in detail.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a block diagram of the basic, successive, interrelated stages of the automated nuclear fuel rod production system of the present invention, being generally designated by the numeral 10. Each of these stages will be described in detail hereafter with reference to the process steps depicted in FIGS. 2 to 5 and the equipment schematically illustrated in FIGS. 6 to 8. However, before proceeding into a detailed discussion of the various stages of the automated system 10, a brief overview of the automated system 10 will be presented.

In a first stage of the automated system 10, represented by block 12 in FIG. 1 which contains the caption, Powder Formulation & Processing, a suitable radioactive gas, such as uranium hexafluoride ($UF_6$), is converted into another radioactive substance in powder form, such as uranium dioxide ($UO_2$), which is then blended into a suitable composition for pellet fabrication. Next, the blended powder is formed into green pellets in a second stage of the automated system 10, being represented by block 14 in FIG. 1 and designated Pellet Fabrication. After fabrication, the green pellets are sintered, sampled, ground, inspected and stored, all of which steps are included under the heading, Pellet Processing, and represented by block 16 in FIG. 1. Concurrently, as the pellets are being fabricated and processed, the other primary part of a nuclear fuel rod, the hollow tube, is being prepared for assembly with the pellets. Block 18 of FIG. 1, called Tube Preparation, represents such activity. Finally, steps carried out in assembling the prepared tubes and stored pellets together and in inspecting the assembled fuel rod are represented by block 20 of FIG. 1 and termed Fuel Rod Fabrication & Inspection.

Powder Formulation & Processing

Figure 2:
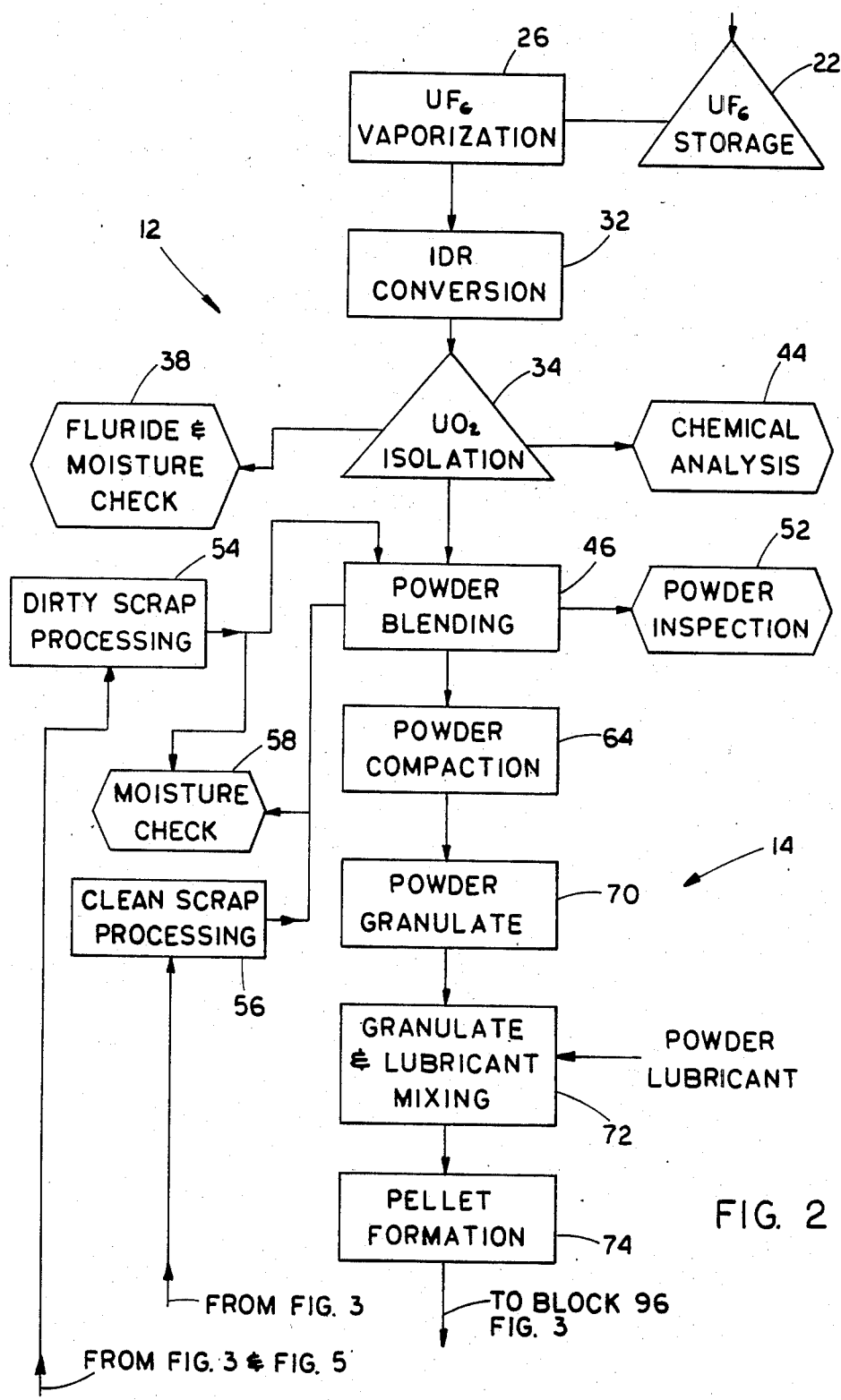
FIG. 2 is a detailed block flow diagram of the process steps involved in the powder formulation and processing and pellet fabrication stages of the automated fuel rod manufacturing system.
Figure 7:
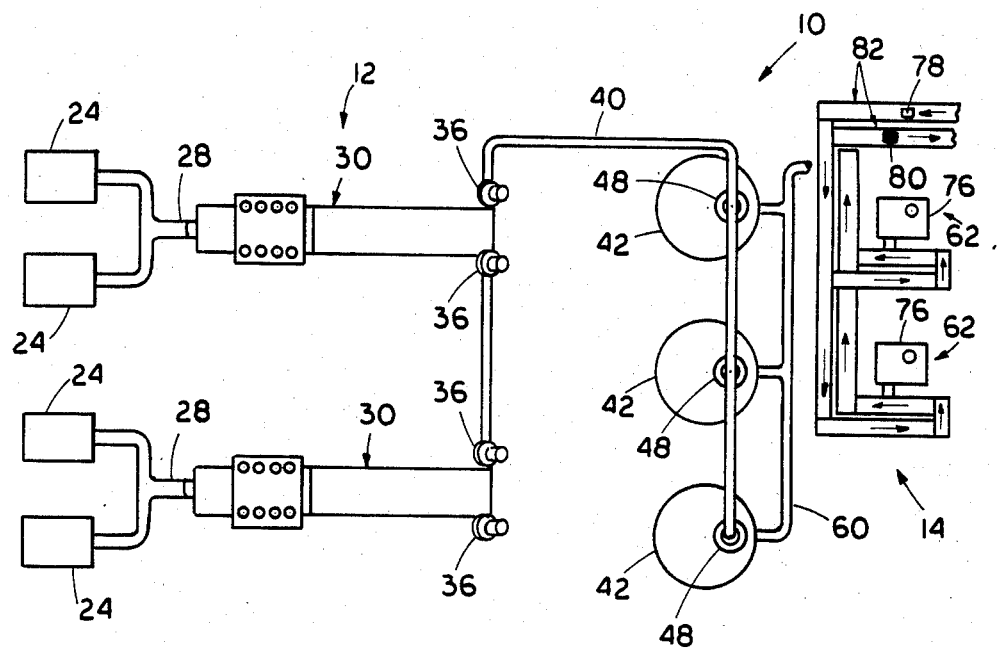
FIG. 7 is a top plan view of the equipment of FIG. 6 with the support structure being omitted for clarity.
Figure 6:
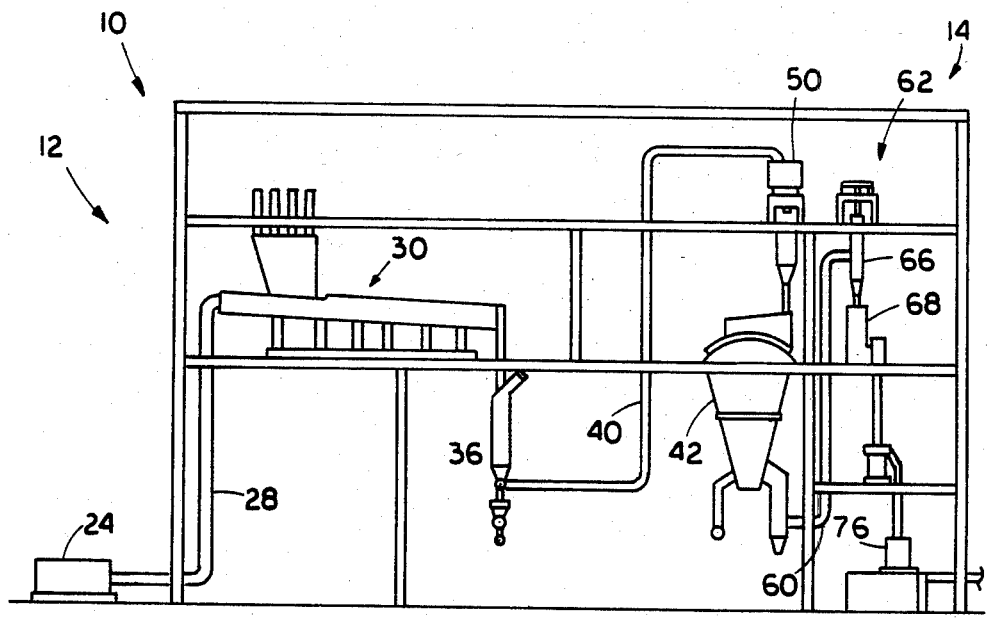
FIG. 6 is a detailed elevational view, in a somewhat simplified form, of the equipment involved in the powder formulation and processing and pellet fabrication stages of the automated fuel rod manufacturing system.

Turning now to FIGS. 2, 6 and 7, there is shown the process steps and equipment involved in the first and second stages, the powder formulation and processing stage 12 and the pellet fabrication stage 14, of the automated fuel rod production system 10. The formulation and processing of a suitable radioactive compound in powder form will be described in this section, with its formation into pellets being reserved for the next section.

The first, or powder formulation and processing, stage 12 of the automated system 10 begins when, as per block 22 of FIG. 2, cylinders containing raw uranium hexafluoride ($UF_6$) gas are released from storage as needed and installed in one of several vaporization units, such as vaporizer vessels 24 illustrated in FIGS. 6 and 7. To vaporize the $UF_6$ gas as per block 26, the cylinders are heated to a temperature of approximately 180 degrees F. in the vessels 24 by circulating hot water sprays therein. The resulting $UF_6$ vapor is supplied under pressure from the cylinders in the vessels 24 through a pair of gas flow lines 28 to a pair of kiln units, such as rotary kilns 30. In the preferred embodiment, as depicted in FIG. 7, a pair of the vaporizer vessels 24 are connected in flow communication with each of the kilns 30 so as to provide sufficient excess capacity to ensure a continuous supply of vapor to the kilns at the same time as a depleted one of the cylinders in one of the vessels is exchanged for a fresh cylinder.

The kilns 30 implement the IDR process, as per block 32 of FIG. 2, by converting the gaseous $UF_6$ to $UO_2$ powder, first, through reaction of the gas with superheated steam at the feed ends of the kilns and, then, through reaction of their intermediate products with a counter-current flow of steam and hydrogen at the product ends of the kilns. The $UO_2$ is discharged by gravity flow from the product ends of the kilns 30 to a temporary storage, as per block 34 of FIG. 2, in the form of a plurality of check hopper units 36.

The check hopper units 36 which together continuously receive uranium dioxide powder from the lower end of the kilns 30 are each of a size to ensure geometric control of the $UO_2$. Powder entering the check hopper units 36 is continuously sampled by a time proportional sampler and analyzed for acceptable quality as to fluoride and moisture content as per block 38 of FIG. 2. The moisture check is made here in order to initiate the exercise of moderation control over the powder during the blending of the same which occurs next. In the preferred embodiment seen in FIG. 7, a pair of the check hopper units 36 are connected in flow communication with each of the kilns 30 such that as at least one of the check hopper units of one pair is being filled from its respective kiln, at least one of the other check hopper units is dispensing its powder while the powder in another of the check hopper units is being sampled. With such arrangement, a sequence of operation can be implemented whereby powder is continuously dispensed from at least one of the check hopper units 36 while in-line sampling of powder is carried out at another unit.

Powder of acceptable quality is discharged continuously from at least one of the check hopper units 36 via a pneumatic transfer line 40 to a plurality of blending units, such as the bulk blenders 42 seen in FIGS. 6 and 7. Powder found to be unacceptable with respect to fluoride and/or moisture is transferred via safe geometry transfer containers (not shown) to a powder rework station (not shown) for further treatment to reduce fluoride and/or moisture content. Reworked powder which meets specifications is then returned to the process stream at the blenders 42.

Each of the bulk blenders 42, in the preferred embodiment, has a 5000-Kg capacity and is used to produce a homogeneous blend which meets product specifications, as confirmed by the performance of a chemical analysis per block 44 of FIG. 2. Each conical shaped blender 42, preferably being three in number, has a rotating internal screw to ensure thorough blending, as per block 46 of FIG. 2. The use of large blenders 42 reduces the number of individual blends which must be made and minimizes blend-to-blend variations. Further, because of the large capacity of the blenders 42, complete elimination of all powder from a batch of one concentration from the kiln and blender components is not now necessary before powder from another batch of a different concentration can be introduced into the blenders.

Transport line diverter valves 48 associated with each of the blenders 42 are actuated to direct powder via a cyclone receiver 50 to one of the blenders while blended powder in another of the blenders is inspected as per block 52 of FIG. 2 and blended powder from the remaining blender is dispensed to pellet fabrication operations immediately downstream of the blenders. In such manner, blended powder is dispensed continuously for uninterrupted pellet fabrication. Also, as indicated by blocks 54, 56 of FIG. 2, powder from dirty and clean scrap processing, after an adequate moisture check as per block 58, can be transferred to the blenders 42 for blending.

Pellet Fabrication

Blended powder from the blenders 42 is transferred via a pneumatic transfer line 60 to pellet fabricating units 62, preferably two in number, which begins the second, or pellet fabrication, stage 14 of the automated system 10. The entire green pellet fabrication process is controlled and operated as an automated integrated system with the pelleting equipment of the units 62 being arranged vertically to permit gravity transfers of material and to minimize floor space requirements. The equipment is enclosed and is subject to controlled ventilation to prevent the spread of airborne particles.

As per block 64 of FIG. 2, blended $UO_2$ powder released from the one of the blenders 42 which happens to be dispensing at the time is fed on demand, via transfer line 60, into a powder compactor 66 of each of the pellet fabrication units 62 as seen in FIG. 6. In the compactor 66, powder is compacted by a slugging press into small wafers or slugs which flows downward to a granulator 68 at the next lower level of each fabrication unit 62. The inlet of the granulator 68 is close-coupled with the discharge of the compactor 66 so that the two devices operate simultaneously. As per block 70 of FIG. 2, the slugs are granulated in the granulator 68 to a composition resembling freeze-dried coffee. Next, as per block 72 of FIG. 2, the granules are combined, on a proportional basis, with a suitable lubricant, such as zinc stearate, and rolled to produce a press feed material that has improved flowability. (The zinc stearate serves as a die lubricant during pellet pressing which follows.) Finally, the granule and lubricant mixture are formed, as per block 74 of FIG. 2, into green pellets by a pellet press 76 at the lowest level of each of the fabrication units 62. The pellets are typically compacted into cylindrical bodies ⅝ths-inch long and ⅜ths-inch in diameter with a 60 percent theoretical density that equals 10.3 grams per cubic centimeter.

Ordinarily, the pellet fabricating units 62, operating at a rate of only about one-half of their combined capacity, provide a continuous stream of green pellets which is sufficient for feeding the processing equipment located downstream. Thus, if one of the fabricating units 62 happens to be temporarily out of commission, the other one can take up the slack and, by operating at or near its capacity, supply the total requirement of green pellets for the next pellet processing stage 16 of the automated system 10.

Pellet Processing

Figure 8:
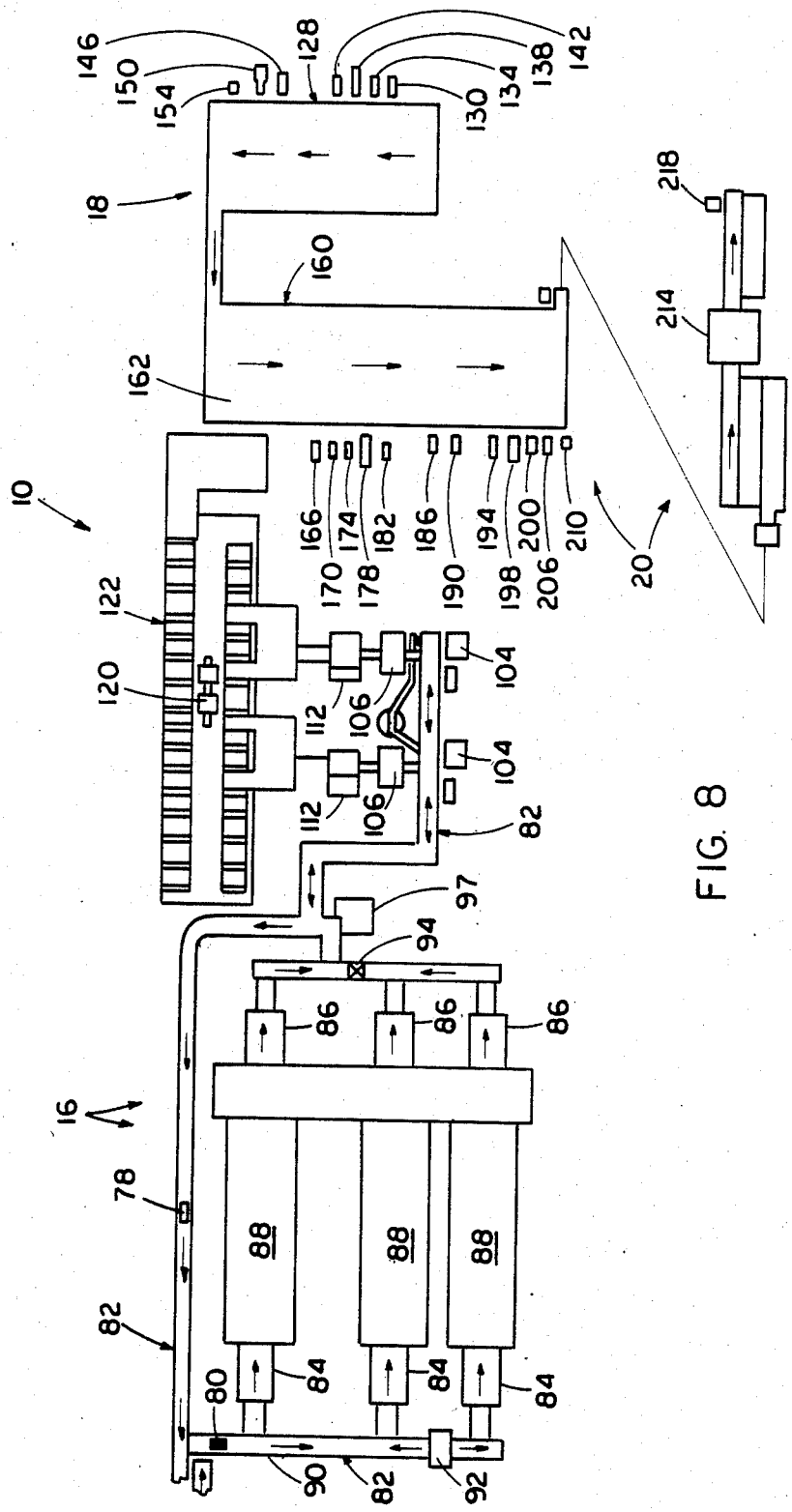
FIG. 8 is a detailed top plan view, in a somewhat simplified form, of the equipment involved in the pellet processing, tube preparation and fuel rod fabrication and inspection stages of the automated fuel rod manufacturing system.

At the beginning of the third, or pellet processing, stage 16 of the automated system 10, empty boats 78 are advanced in a procession thereof toward, while boats 80 loaded with green pellets are moved away from, the discharge of the pellet press 76 by a conveyor 82. Only an end of the conveyor 82, as depicted in FIGS. 6 and 7, is associated with the pellet fabrication units 62. Most of the conveyor 82 is seen in FIG. 8 wherein it is arranged to deliver boats to and remove boats from respective infeed and discharge ends 84, 86 of a plurality of sintering furnaces 88 as well as other processing equipment to be discussed later. In addition to conveying the boats, the conveyor 82 provides in process storage of both empty and full boats.

At the discharge of the fabrication units 62, the green pellets are gently loaded in an orderly array within the molybdenum sintering boats 78, 80 and then moved by the conveyor 82 to a branch 90 thereof where a shuttle car 92 delivers individual loaded boats 80 to the infeed ends of the furnaces 88. A boat 80 loaded with green pellets at the infeed end 84 of one sintering furnace 88 is conveyed through the furnace by a walking beam device employed by each furnace and emerges as boat 94 loaded with sintered pellets.

In each furnace 88, the pellets are sintered, as per block 96 of FIG. 3, to a specified 95 percent theoretical density in a hydrogen atmosphere at approximately 1750 degrees C. to achieve the required density and microstructure. The boat handling and furnace operations are mechanized in their entirety and monitored and controlled as an integrated system from a single control station. Multiple sintering furnaces 88, such as three in number, are used to allow excess capacity so that a continuous stream of sintered pellets can be provided to the remainder of the processing equipment even when one of the furnaces is temporarily out of commission.

After the boats 94 loaded with sintered pellets exit the discharge ends of the furnaces 88, they are automatically transported by the conveyor 82 to a sampling station 97 where representative ones of the sintered pellets in each boat are randomly sampled and their density inspected, as per block 98 of FIG. 3. Low density pellets are routed by a branch (not shown) of the conveyor 82 for resintering in the furnaces 88. High density (overdense) pellets are routed to clean scrap recovery, as per block 56 of FIG. 2. Other measurements and checks are performed of the pellet samples, as per blocks 100 and 102 of FIG. 3, some of which take several days before the pellets are finally approved. Therefore, the unapproved sintered pellets are advanced through the next step in the pellet processing stage 16 and thereafter stored where they will await approval before assembly into a fuel rod.

The boats 94 of unapproved sintered pellets are conveyed to one of a pair of unloading units 104, as seen in FIG. 8, where the boats are unloaded and the pellets oriented in single file are fed to one of a pair of grinding units 106. The pellets are centerless ground in a dry grinding operation, as per block 108 of FIG. 3, using a diamond grinding wheel to achieve acceptable surface finish and proper diameter. The material removed during grinding is collected by a dust collection system and the recovered swarf is collected, as per block 110 of FIG. 3, and returned to clean scrap recovery, as per block 56 of FIG. 2.

The ground pellets are then fed in single file to one of a pair of inspection stations 112 where on-line diameter and surface quality inspection is carried out, as per block 114 of FIG. 3, by suitable devices paced to the operation of the grinding units 106. Also, additional tests are performed on the pellets, as per blocks 116,118 of FIG. 3. Unacceptable pellets are sorted and sent to either dirty scrap processing, as per block 54 of FIG. 2, or clean scrap processing, as per block 56 of FIG. 2, depending on the particular contaminant and/or defect associated with the pellet.

Acceptable pellets are loaded, row by row, onto clean pellet trays which are then routed by a tray transfer device 120 into an auto storage and retrieval system 122, as seen in FIG. 8, to an identified storage position, as per block 124 of FIG. 3. The pellets stay in the system 122 pending receipt of quality control approval of their earlier sampling and, after approval is received, until required for fuel rod tube loading. The storage area of the system 122 is designed to hold a 3-4 day requirement of pellets. Such excess capacity ensures that continuous assembly of pellets with tubes can be accommodated while awaiting up to 2 days to receive results of laboratory tests on the pellet samples. Furthermore, tray movement into, from, and within the storage and retrieval system 122 is directed and controlled in such manner that the system has the capability to trace the location of individual trays or of groups of trays as required to maintain traceability.

Tube Preparation

The remaining two stages of the automated fuel rod production system 10, the tube preparation stage 18 and the fuel rod fabrication and inspection stage 20 which are arranged in tandem, are carried out concurrently with the first three stages described above. By so doing, tubes will be prepared and ready for insertion of nuclear fuel pellets by the time processing of the pellets has been completed whereby a continuous (paced) assembly line type production of fuel rods can be achieved. The steps involved in the preparation of fuel rod tubes will be described in this section, while the assembly and inspection of the fuel rods will be reserved for the final section.

Figure 4:
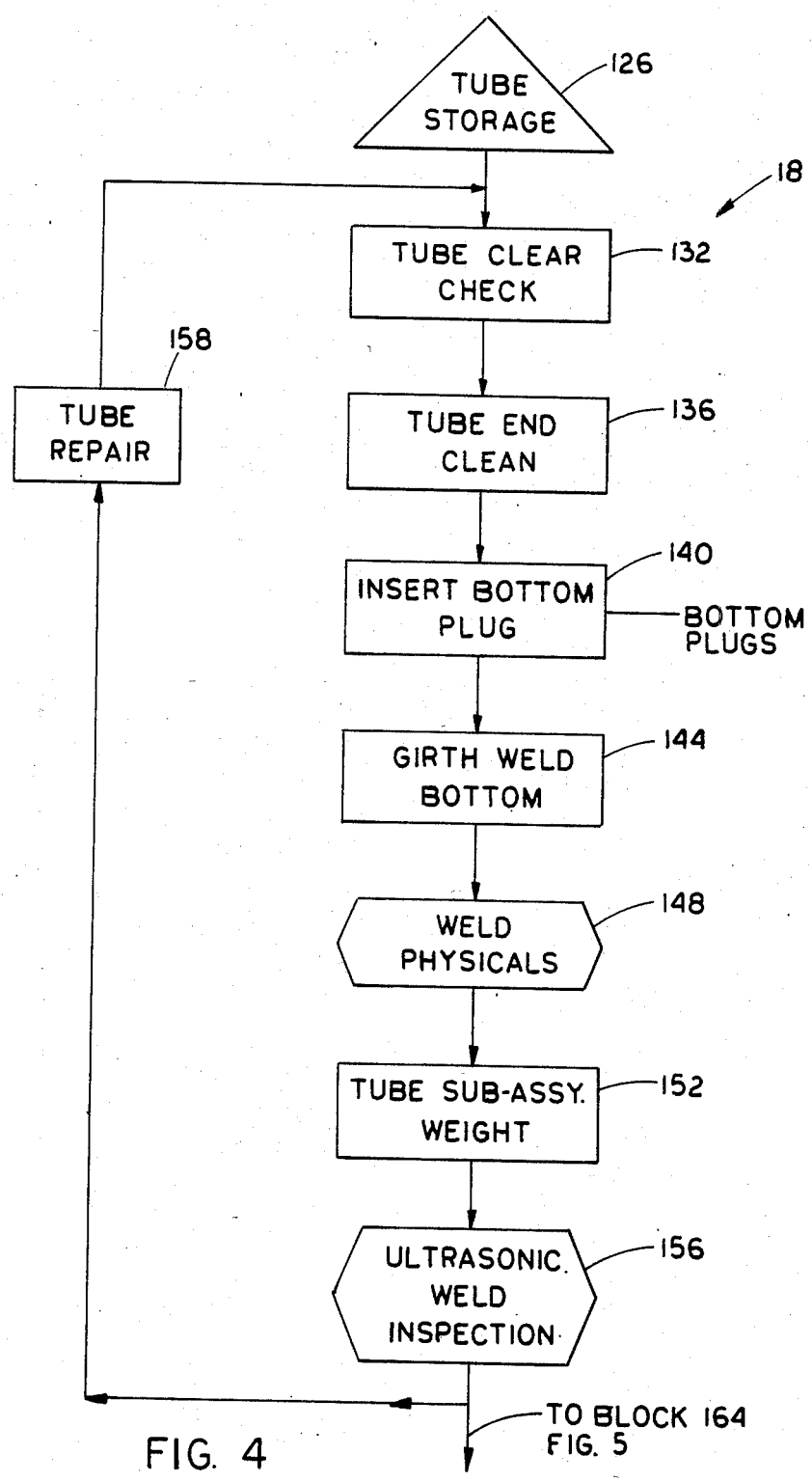
FIG. 4 is a detailed block flow diagram of the process steps involved in the tube preparation stage of the automated fuel rod manufacturing system.

Referring now to FIGS. 4 and 8, the tube preparation stage 18 begins when, as per block 126, tubes are taken from storage and delivered to a tube indexer system 128, seen in FIG. 8. The tube indexer system 128 is a synchronous transporter which transfers tubes through the various preparation and inspection operations of this stage. In the system 128, multiple indexing units are used with transition and feed devices separating the units. The transition and feed devices provide a pause in the system which increases system availability.

Initially, the serial number of each tube is read using an automatic image recognition device (not shown) which verifies the correct label and enters all information for the tube into the traceability system. Then the tube is indexed by the system 128 to a checker station 130 seen in FIG. 8 where, as per block 132 of FIG. 4, the tube is checked to see if it is clear internally. If the tube is not clear an operator is alerted and the tube is not indexed. From the station 130, the tube then goes to a cleaner station 134 where, as per block 136 of FIG. 4, a tube cleaner engages the tube end (normally the lower end), grips it and with a rotating action wipes the end with a cleaning material. The cleaning media is discarded to a collection can, the head of the cleaner retracts and prepares for the next cycle.

The lower end of the tube is now prepared for receiving an end plug at a next, tube plugger station 138 of FIG. 8. After being moved to station 138, the tube is gripped by a clamp and, as per block 140 of FIG. 4, a plug is pressed into the tube end. Then, the plugged tube is advanced to a weld station 142, inserted into a weld chamber and, as per block 144 of FIG. 4, a girth weld is made on the tube-to-plug joint. When completed, the tube is transferred to a transition device (not shown).

Between the weld station 142 and the downstream inspection operations coming up next, the tubes are surged to form a break between the two indexing transporters of the indexer system 128. Then, from the transition device, the tube is advanced to a weld physicals check station 146 seen in FIG. 8 where, as per block 148 of FIG. 4, the weld beam on the tube is checked for diameter and surface discoloration. After weld physicals check, each tube is transferred to a weighing station 150 where the tube is weighed as per block 152 of FIG. 4. Finally, the tube weld is ultrasonically inspected at station 154 of FIG. 8, as per block 156 of FIG. 4. If the weld is accepted the tube is transferred downstream to a tube transporter (not shown) where it is transferred axially in preparation for fuel pellet loading operations.

Tubes with rejected bottom end welds are removed from the process stream to a repair station (not shown), as per block 158 of FIG. 4, where the tube end plug is removed and the tube is again recycled through the tube preparation operations as described above.

Fuel Rod Fabrication & Inspection

In the fifth and final, or fuel rod fabrication and inspection, stage 20 of the automated system 10, the fuel rod tube prepared during the previous stage 18 and pellets stored in the storage and retrieval system 122 are brought together. The $UO_2$ fuel pellets are loaded into the tube, then a spring is inserted and an upper end plug is applied and welded to the tube, after which the tube is internally pressurized and sealed. These are the basic assembly steps. They are followed by a multiple of inspection operations, although a few checks are interspersed between the assembly steps. In a tube indexing system 160, a synchronous transporter transfers tubes through the various fabrication and inspection operations. Groups of operations are separated by a transition device of the system 160. Rods are surged at various intervals in the fabrication and inspection stage to form a break between indexing transporters.

First, prepared fuel tubes are fed from the axial conveyor to a surge conveyor of the fuel rod fabrication indexer system 160. A plurality of tubes, such as 25 tubes, are accumulated and transferred onto the pellet loading table 162 in FIG. 8 where, as per block 164 of FIG. 5, a vibratory loader is actuated and approved pellets are moved into the tubes. The pellets are transferred on trays to the loading table automatically from the storage and retrieval system 122. The pellets are then swept off of the trays onto the loading table for vibratory feeding into the tubes.

Following the loading operation, tubes, now referred to as rods, are transferred to a transition section and then in order are transferred to the rod indexing transporter of the indexer system 160. At this time, each rod number is scanned and stored in a file for traceability.

Figure 5:
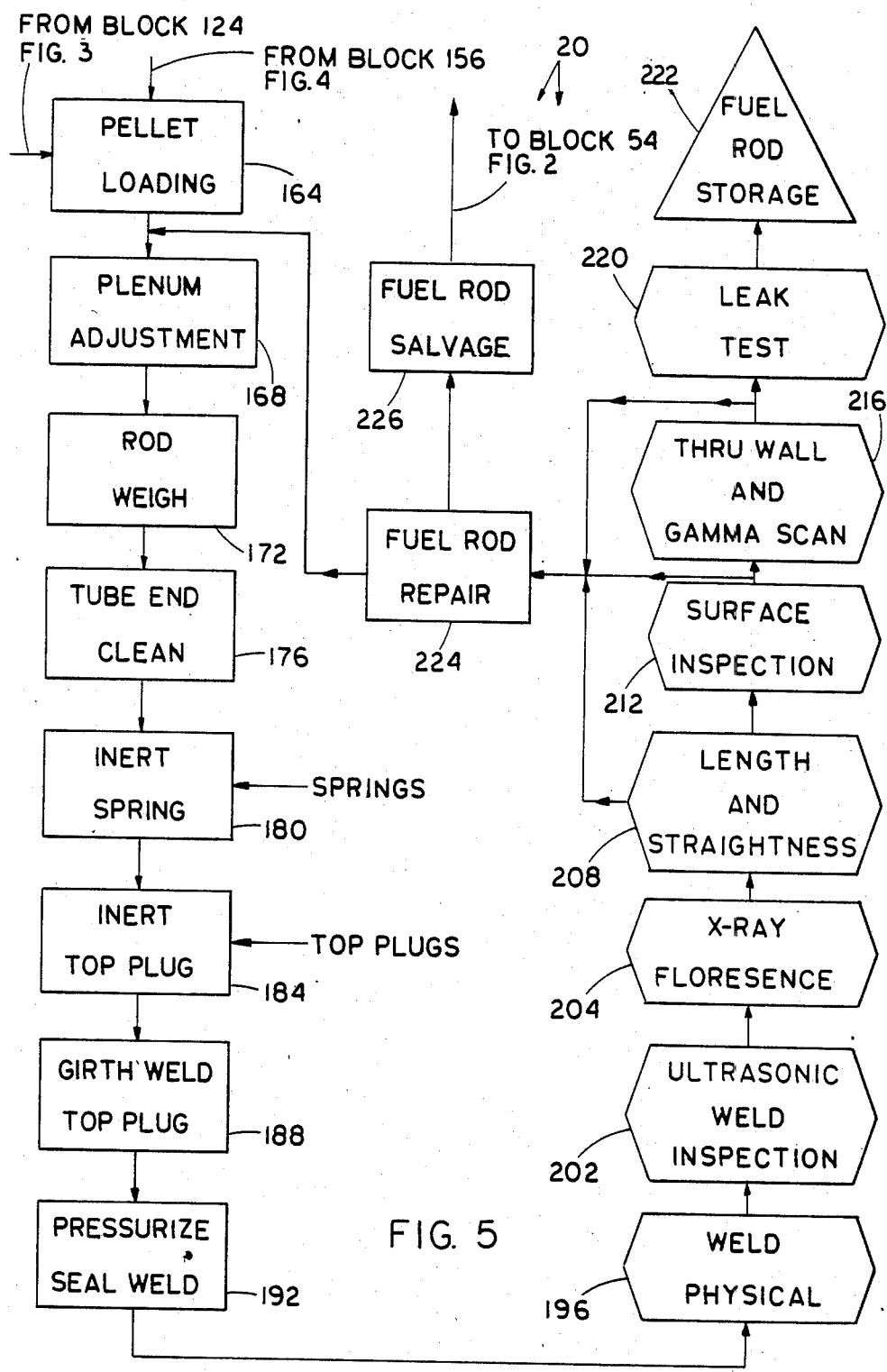
FIG. 5 is a detailed block flow diagram of the process steps involved in the fuel rod fabrication and inspection stage of the automated fuel rod manufacturing system.

The first station following pellet loading in FIG. 8 is the plenum gage station 166 where, as per block 168 of FIG. 5, the rod plenum is measured and then pellets added or removed depending on the plenum measurement. After plenum adjustment, the rod is weighed at station 170, as per block 172, and then the top rod end is cleaned at station 174, as per block 176 of FIG. 5, in the same manner as the bottom end cleaning operation was carried out. Thereafter, a plenum spring is inserted into each of the rods at station 178, in accordance with block 180 of FIG. 5, followed by pressing a plug into the upper end of the rod and compressing the spring therein at plugging station 182 of FIG. 8, as represented by block 184 in FIG. 5.

Fabrication of the fuel rod is completed by girth welding the plug and rod joint at girth weld station 186, as per block 188 of FIG. 5, and then pressurizing the rod with helium at station 190 with a seal weld being made on the plug end, as per block 192 of FIG. 5.

Prior to the girth welding operation, the rods were surged to break the synchronous operations into a second group. Once again after fabrication of the fuel rod is finished and before inspection begins, the rods are surged to break the synchronous operations into a third group. Then the rods are fed to an indexing transporter of the indexer system 160 where at a first station 194 in FIG. 8, as per block 196 of FIG. 5, a weld physical check is made. The weld bead is basically checked for diameter and discoloration in the weld area. Following next in sequence, as seen in FIG. 8, the rod is inspected ultrasonically and by x-ray florescence at respective stations 198 and 200, as per respective blocks 202 and 204, followed by checks for straightness and length at a station 206, as per block 208 of FIG. 5, and an inspection of the tube surface for scratches and marks at a station 210, as per block 212 of FIG. 5.

After surface inspection, fuel rods are transferred downstream to a transition conveyor of the indexer system 160 where they are in turn fed to a gamma scanner station 214. As per block 216 of FIG. 5, the rods are scanned automatically for presence of internal components, pellet stack continuity, enrichment verification and plenum length. Results are entered into the traceability system. After a helium leak test at a station 218, as per block 220 of FIG. 5, the acceptable rods are sent to storage, as per block 222.

Rods rejected from any of the inspection operations are identified and transferred to a processing area, as per block 224 of FIG. 5, where corrective action can be taken, after which the rod is returned to the rod fabrication operations or to a fuel rod salvage location, as per block 226 of FIG. 5.

From the foregoing description, it will be understood that the automated system 10 is capable of achieving a high rate of production in a dedicated, continuous (paced) flow mode of operation by providing excess capacity at critical stages of the system. It integrates process operations, quality control inspection, improved materials flow, and accountability which results in a reduction of manufacturing cycle time. Also, it incorporates improved features for the containment of special nuclear materials, with enhanced ventilation to minimize the amount of airborne material and achieve reduced occupational exposure levels, not only during routine operations, but also to facilitate containment during maintenance.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In an automated system of nuclear fuel rod production, the combination comprising:
    (a) a powder formulation and processing stage including
        (i) a plurality of vaporization units for supplying a radioactive material in the form of a gas,
        (ii) a plurality of kiln units connected in flow communication with said vaporization units for receiving said gas from said vaporization units and converting said radioactive material from the form of said gas to the form of a powder, said plurality of kiln units being less in number than said plurality of vaporization units, one of said kiln units being connected with a pair of said vaporization units,
        (iii) a plurality of check hopper units being connected in flow communication with said kiln units for receiving said powder from said kiln units, for holding said powder for sampling and inspection and for dispensing said powder therefrom, said plurality of check hopper units being greater in number than said plurality of kiln units, a pair of said check hopper units being connected with one of said kiln units such that as at least one of said check hopper units of said pairs thereof is being filled from its respective one kiln unit, at least another of said check hopper units of said pairs thereof is dispensing its powder while the powder in at least still another of said check hopper units of said pairs thereof is being sampled whereby powder can be continuously dispensing from at least one of said check hopper units while in-line sampling of said powder is being carried out, each of said check hopper units being of a predetermined capacity less than geometric control of the radioactive material;
        (iv) a plurality of blending units connected in flow communication with said check hopper units for receiving said powder from said check hopper units and for blending said powder into a radioactive composition suitable for use as nuclear reactor fuel, said plurality of blending units being fewer in number than said check hopper units and greater in number than said plurality of kiln units, said blending units each having a capacity which exceeds geometric control of the radioactive material but which maintains said material under moderation control, and (v) valve means for causing the filling of one of said plurality of blending units at a time with powder from said check hopper units such that as one of said blending units is being filled, another of said blending units is being analyzed and yet another of said blending units is being dispensed whereby blended powder can be dispensed continuously from said blending units;

(b) a pellet fabrication stage including (i) a plurality of pellet fabricating units connected in flow communication with said blending units for receiving said blended powder from said one of said blending units which happens to be dispensing at any given time, said pellet fabricating units being operable to press said powder into slugs, then granulate said slugs, next mix said granulated powder with lubricant and finally form said mixture into a succession of green pellets of said radioactive composition, said fabricating units being fewer in number than said blending units but capable of providing a continuous stream of said green pellets; and (c) a pellet processing stage including (i) a multiplicity of sintering boats, (ii) means for conveying said sintering boats and for providing surge storage thereof, (iii) means for loading green pellets from said pellet fabricating units into said sintering boats on said conveying means, and (iv) a plurality of sintering furnaces arranged with said conveying means such that each of said loaded boats is directed to an infeed end of one of said furnaces, is moved through said one furnace for sintering the pellets loaded therein and is directed from a discharge end of said one furnace at the completion of sintering, said sintering furnaces being greater in number than said green pellet fabricating units.

2. The automated system as recited in claim 1, said pellet processing state further including:

(v) means for receiving said loaded boats in a successive manner after discharged from said sintering furnaces for sampling at least one of said sintered pellets therein;

(vi) a plurality of pellet grinding units for grinding said sintered pellets to precise predetermined dimensions;

(vii) means for unloading sintered pellets from said boat on said conveying means in single file into said pellet grinding units;

(viii) a plurality of inspection units for inspecting said ground pellets;

(ix) a pellet storage and retrieval unit for receiving said inspected pellets and storing the same; and (x) means for conveying said pellets in single file from said grinding units through said inspection unit to said storage and retrieval unit.

3. The automated system as recited in claim 2, wherein said pellet storage and retrieval unit contains sufficient capacity for storing said inspected pellets until needed in fuel rod fabrication.

4. In an automated system of nuclear fuel rod production, the combination comprising:

(a) a radioactive powder formulation and processing stage including (i) a plurality of vaporization units for supplying a radioactive material in the form of a gas, (ii) a plurality of kiln units connected in flow communication with said vaporization units for receiving said gas from said vaporization units and converting said radioactive material from the form of said gas to the form of a powder, said plurality of kiln units being less in number than said plurality of vaporization units, one of said kiln units being connected with a pair of said vaporization units, (iii) a plurality of check hopper units being connected in flow communication with said kiln units for receiving said powder from said kiln units, for holding said powder for sampling and inspection and for dispensing said powder therefrom, said plurality of check hopper units being greater in number than said plurality of kiln units, a pair of said check hopper units being connected with one of said kiln units such that as at least one of said check hopper units of said pairs thereof is being filled from its respective one kiln unit, at least another of said check hopper units of said pairs thereof is dispensing its powder while the powder in at least still another of said check hopper units of said pairs thereof is being sampled whereby powder can be continuously dispensing from at least one of said check hopper units while in-line sampling of said powder is being carried out, each of said check hopper units being of a predetermined capacity less than geometric control of the radioactive material, (iv) a plurality of blending units connected in flow communication with said check hopper units for receiving said powder from said check hopper units and for blending said powder into a radioactive composition suitable for use as nuclear reactor fuel, said plurality of blending units being fewer in number than said check hopper units and greater in number than said plurality of kiln units, said blending units each having a capacity which exceeds geometric control of the radioactive material, and (v) valve means for causing the filling of one of said plurality of blending units at a time with powder from said check hopper units such that as one of said blending units is being filled, another of said blending units is being analyzed and yet another of said blending units is being dispensed whereby blended powder can be dispensed continuously from said blending units;

(b) a pellet fabrication stage including (i) a plurality of pellet fabricating units connected in flow communication with said blending units for receiving said blended powder from said one of said blending units which happens to be dispensing at any give time, said pellet fabricating units being operable to press said powder into slugs, then granulate said slugs, next mix said granulated powder with lubricant and finally form said mixture into a succession of green pellets of said radioactive composition, said fabricating units being fewer in number than said blending units but capable of providing a continuous stream of said green pellets;

(c) a pellet processing stage including
  (i) a multiplicity of sintering boats,
  (ii) means for conveying said sintering boats and for providing surge storage thereof,
  (iii) means for loading green pellets from said pellet fabrication units into said sintering boats on said conveying means,
  (iv) a plurality of sintering furnaces arranged with said conveying means such that each of said loaded boats is directed to an infeed end of one of said furnaces, is moved through said one furnace for sintering the pellets loaded therein and is directed from a discharge end of said one furnace at the completion of sintering, said sintering furnaces being greater in number than said green pellets fabricating units,
  (v) means for receiving said loaded boats in a successive manner after discharged from said sintering furnaces for sampling at least one of said sintered pellets therein,
  (vi) a plurality of pellet grinding units for grinding said sintered pellets to precise predetermined dimensions,
  (vii) means for unloading sintered pellets from said boat on said conveying means in single file into said pellet grinding units,
  (viii) a plurality of inspection units for inspecting said ground pellets,
  (ix) a pellet storage and retrieval unit for receiving said inspected pellets and storing the same, and
  (x) means for conveying said pellets in single file from said grinding units through said inspection unit to said storage and retrieval unit;
(d) a tube preparation stage including
  (i) means for preparing fuel rod tubes for receiving said stored pellets; and
(e) a fuel rod fabrication and inspection stage including
  (i) means for assembling said tubes and pellets into completed fuel rods, and
  (ii) means for inspecting said completed fuel rods.

5. In an automated system of nuclear fuel rod production, a powder formulation and processing stage comprising the combination of:
(a) a plurality of vaporization units for supplying a radioactive material in the form of a gas;
(b) a plurality of kiln units connected in flow communication with said vaporization units for receiving said gas from said vaporization units and converting said radioactive material from the form of said gas to the form of a powder, said plurality of kiln units being less in number than said plurality of vaporization units, one of said kiln units being connected with a pair of said vaporization units;
(c) a plurality of check hopper units being connected in flow communication with said kiln units for receiving said powder from said kiln units, for holding said powder for sampling and inspection and for dispensing said powder therefrom, said plurality of check hopper units being greater in number than said plurality of kiln units, a pair of said check hopper units being connected with one of said kiln units such that as at least one of said check hopper units of said pairs thereof is being filled from its respective one kiln unit, at least another of said check hopper units of said pairs thereof is dispensing its powder while the powder in at least still another of said check hopper units of said pairs thereof is being sampled whereby powder can be continuously dispensing from at least one of said check hopper units while in-line sampling of said powder is being carried out, each of said check hopper units being of a predetermined capacity less than geometric control of radioactive material;
(d) a plurality of blending units connected in flow communication with said check hopper units for receiving said powder from said check hopper units and for blending said powder into a radioactive composition suitable for use as nuclear reactor fuel, said plurality of blending units being fewer in number than said check hopper units and greater in number than said plurality of kiln units, said blending units each having a capacity which exceeds geometric control of the radioactive material but which maintains said material under moderation control; and
(e) valve means for causing the filling of one of said plurality of blending units at a time with powder from said check hopper units such that as one of said blending units is being filled, another of said blending units is being analyzed and yet another of said blending units is being dispensed whereby blended powder can be dispensed continuously from said blending units.

6. The automated system as recited in claim 5 wherein said plurality of said blending units includes yet another blending unit containing blended powder which can be analyzed as said one of said blending units is being filled with powder and as blended powder is being dispensed from said another of said blending units.

* * * * *